United States Patent Office 3,338,876
Patented Aug. 29, 1967

3,338,876
THIOUREA-CURABLE ACRYLATE STOCKS, VULCANIZATION PROCESS AND VULCANIZATE THEREFROM
Gaylord A. Kanavel, Yardley, and George F. Bulbenko, Levittown, Pa., assignors to Thiokol Chemical Corporation, Bristol, Pa., a corporation of Delaware
No Drawing. Filed May 18, 1964, Ser. No. 368,369
38 Claims. (Cl. 260—79.5)

ABSTRACT OF THE DISCLOSURE

Acrylate interpolymers prepared from at least 1% of an active-chlorine containing acrylate monomer and up to 99% of a non-chlorine containing acrylate monomer are cured with thiourea and/or its derivatives to form acrylate elastomers.

---

This invention relates to novel rubber vulcanizates, and more particularly to thiourea-curable acrylate stocks, the vulcanization process therefor and the vulcanizates produced thereby.

A variety of curing or vulcanization agents for acrylate polymers have been used in the past, such as triethylenetetramine; hexamethylenediamine carbamate; and the reaction product of ethyl chloride, formaldehyde and ammonia, which is better known by the name "Trimene base." Curable stocks formed from such acrylate/curing agent compositions of the prior art, however, present substantial problems to practitionars in the art. Among these is poor bin-stability; this is due to the fugitive nature of some curing agents, or to the premature cure of the stocks even at moderate ambient storage temperatures, because some curing agents are excessively "hot." Another problem encountered is that of the progressive migration of curing agent to the surface of the stock prior to and during vulcanization in steel molds, which result in a pitting, or staining of the steel interior surfaces of the molds due to the corrosive nature of the curing agent used. Migration of the curing agent also makes consistent uniformity of cure throughout the molded articles a questionable occurrence. The fugitive nature of some curing agents, in addition to providing poor bin stability, makes assurance of uniformity and adequacy of cure throughout the molded articles also questionable.

An object of this invention is to provide novel non-corrosive curable acrylate stocks and vulcanizates thereof.

Another object of this invention is to provide curable acrylate rubber stocks which have excellent bin stability, that is, stocks which may be stored for prolonged periods of time prior to the curing thereof without detrimental loss of curing activity or uniformity of cure in the vulcanizate.

A further object of this invention is to provide curable acrylate rubber stocks which exhibit substantially constant curable properties over prolonged periods of storage.

Other desirable objects of this invention will be apparent from or are inherent in the following explanations and examples.

It has been unexpectedly found that organic thioureas of type I structure, viz.

(I) 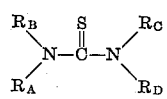

wherein $R_A$, $R_B$, $R_C$ and $R_D$ may be hydrogen, monovalent n-alkyl, iso-alkyl, tert.-butyl, cycloalkyl-alkyl, or amino radicals, wherein at least one of $R_A$, $R_B$, $R_C$, and $R_D$ is hydrogen, and not more than one is a tert.-butyl or an amino radical, and of type II structure, viz.

(II) 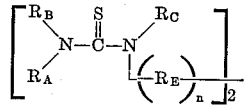

wherein
$R_A$, $R_B$, and $R_C$ are as is defined above, $R_E$ is a divalent n-alkylene radical, and $n$ is a whole number of one or more, 1, 2, and 3 preferred,
can be used as curing agents for curable acrylate polymers to provide curable acrylate stocks which have good bin stability, which are non-corrosive, which provide uniform non-curing storage properties at ambient temperatures and uniform curing properties at elevated vulcanization temperatures when such type I and/or type II thioureas, hereinafter termed "thioureas," are uniformly admixed with acrylate interpolymers formed from (i) a major portion of one or more non-chlorine-containing polymerizable acrylate-type monomeric materials, such as methyl mathacrylate, methyl acrylate, ethyl acrylate, butyl acrylate, acrylonitrile, and ethyl-hexyl acrylate etc., and from
(ii) a minor proportion of at least 1 to 5 weight percent of one or more active-chlorine-containing, ethylenically unsaturated polymerizable monomers such as 2-chloroethylvinyl ether and chloroethyl acrylate.

About 1 to 6, and preferably 2 to 4 parts by weight of the present thioureas per 100 parts by weight of the above defined acrylate interpolymers may be usefully employed as the effective quantities of such curing agents, according to the practice here taught.

The present thioureas are characterized by having therein at least one thiourea grouping of atoms, viz.

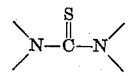

to which various monovalent or divalent radicals may be bonded, and wherein at least one of which such radicals is hydrogen. Of the three remaining bonds available to each thiourea grouping of atoms, according to this invention, not more than one may be joined to an amino radical, viz.

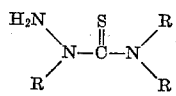

and not more than one may be joined to a tert.-butyl radical, viz.

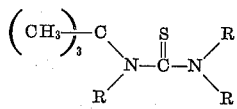

Although it is not fully known why thioureas of types I and II provide the desirable effects enumerated above, when they are used in curable compositions of this invention in the quantities prescribed as above, the above defined acrylate interpolymers will cure according to the present process to form elastomers in accord with the objects of this invention.

Among the more common type I thioureas useful herein may be included such thioureas as thiourea, viz.

$$H_2N-\overset{S}{\underset{\parallel}{C}}-NH_2$$

ethylthiourea, viz.

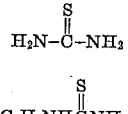

diethylthiourea, viz.

n-dibutylthiourea, viz.

tert.-butylthiourea, viz.

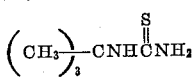

thiosemicarbazide, viz.

dicyclohexylthiourea, viz.

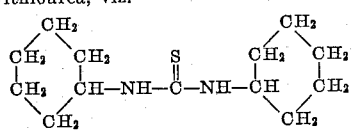

cyclohexylthiourea, viz.

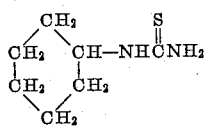

trimethylthiourea, viz.

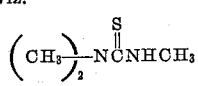

etc.

Among the more common type II thioureas useful herein may be included such bis(thioureas) as n-hexamethylene sym-bis(cyclohexylthiourea) viz.

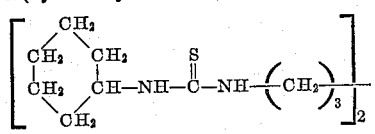

ethylene sym-bis(tert.-butylthiourea) viz.

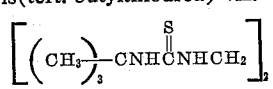

etc.

The curable acrylate compositions of this invention employ solid acrylate interpolymers such as were defined above.

The active-chlorine-containing ethylenically unsaturated monomers usefully employed may generally be designated by the structure corresponding to R{R*}C—CH₂—Cl; wherein R* is a chlorine-activating group such as a chalcogen, e.g. sulfur or oxygen, a carbonyl group, an ester group, or an ethylenically unsaturated group, viz.

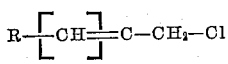

and wherein R may be hydrogen, alkyl, aryl, etc. The salient features of the active-chlorine-containing ethylenically unsaturated monomer are that (i) it contain a chlorine that is two carbon atoms away from, or beta to, an activating group such as is described above, and that (ii) it contains at least one ethylenically unsaturated group at least two carbon atoms removed, or at least beta to, the chlorine. Additional exemplary active-chlorine-containing ethylenically unsaturated monomers include the 1-chloro-2-butenyl esters of acrylic and methacrylic acids, and their 1-chloro-beta-ethylenically-unsaturated homologs and analog; the 1-chloro-2-thio-ethers, thio-carbonyls, and thio-esters of ethylenically unsaturated compounds, etc.

Small vulcanizate modifying quantities of other nonacrylate type, and non-active-chlorine-containing comonomers are sometimes desirably used to help form the present interpolymers and produce vulcanizates with modified properties. Such comonomers do not detract from the ability of the present thioureas to cure active-chlorine-containig acrylate interpolymers as defined herein. They may be used in quantities up to about 10% by weight of the total monomer charge, and include in their number ethylenically unsaturated comonomers which do not have an active chlorine as defined above, and which are not acrylate-type materials. Exemplary of such comonomers are the lower olefin monomers, such as ethylene, propylene, and butylene; and vinyl monomers, such as vinyl chloride, vinylidene chloride, vinyl acetate, etc.; styrene; maleic anhydride; acrylamide; allyl alcohol and other allylic monomers such as allyl chloride and allyl amine.

In the polymerization of the presently useful acrylate interpolymers the monomers are charged into a vessel containing a suspending agent and water; the temperature of the vessel is regulated within the temperature range of room temperature to about 50° C. To this mixture is added a polymerization initiator completely dissolved in an organic solvent; the reaction vessel is then heated to a temperature within the range of about 50° C. to 90° C. until the polymerization is complete. It is advantageous that the solvent which is employed for the initiator have a boiling point at about the desired polymerization temperature. In this way, by utilization of reflux techniques one has an easy means for temperature regulation, and to thoroughly agitate the reaction mixture during the course of polymerization. The amount of initiator that is employed is generally from 0.05 to 1.0 percent by weight, based on the weight of the reacting monomers. Preferably, an amount of initiator of about 0.1 weight percent is utilized. The preferred initiators are azobisisobutyronitrile and benzoyl peroxide. The amount of suspending agent that is employed is generally about 1.5 percent by weight, based on the weight of the reacting monomers. It is important that the suspending agent be completely dissolved in a solvent such as water before being added to the monomer mixture. The solvent for the initiator may be benzene, or some similar solvent.

Several procedures may be used for the recovery and purification of the polymer product from the reaction mixture. For example, the reaction mixture may be washed in a salt solution to separate out the polymer. The polymer is separated and washed with water until the wash water is clean of solvent and unreacted monomers. The interpolymers so obtained are then freed of their wash water prior to use in formation of the curable stocks of the invention.

The curable acrylate/thiourea stocks of this invention are prepared as blended uniform admixtures of the acrylate interpolymers, the present thiourea curing agents, and, optionally, such sundry curing agent modifiers, fillers and other adjuvant materials as may prove useful to impart the vulcanization rate and vulcanizate properties desired for specific fabrication end uses. Such curable acrylate/thiourea stocks are hereinafter termed "stocks." These stocks may be prepared by a blending at ambient temperatures of component ingredients on a rubber mill or in an internal ram-type mixer, such as the "Banbury." Such blending is substantially aided by the physical nature of the present thioureas; they are solids which, in general are comminuted to free-flowing, relatively high melting powders and thus may be uniformly dispersed with facility throughout the stock during the mixing step of the present process.

Among the more important adjuvants that may be blended into the present stocks as optional components are the so-called curing agent modifier materials. These substances ofttimes improve the bin stability, and speed the cure rate of the stocks prepared with the present thioureas. One may use about 2 to 10 and preferably about 5 parts of one or more curing agent modifiers commonly used with acrylates such as, dibasic lead phosphite and red lead. The use of red lead is preferred in the present stocks to prevent pock marking of the vulcanizates that may be obtained during the relatively short cure cycles provided by the process of the present invention. The useful curing agents and curing agent modifiers of the present invention may be used, moreover, in combination with other of the usual acrylate rubber stock adjuvants to advantage for uses common to such adjuvants. Reinforcing agents, fillers, accelerators, plasticizers, antioxidants, age resistors, modifying resins, dyes, pigments, fungicides, etc. are among such useful adjuvants.

The curable stocks prepared according to the present invention may be cured according to conventional procedures, using cure temperatures of from about 250° F. to 450° F. for 1 to over 30 minutes, the higher cure temperatures being used for the shorter cure periods, to provide the present novel acrylate elastomeric vulcanizates with excellent physical properties.

The vulcanized acrylates prepared according to the present invention are usefully employed in valve stem seals, rear main seals, lip seals, spring loaded oil seals, inner clutch piston seals, ball bearing shields, cements, specialty aircraft components, coated fabrics, hoses, and also in rubber seals and parts for heavy duty, off-road equipment.

The following description and examples are merely illustrative of various modes of practice of the present invention and are not intended as a limitation upon its scope.

*Preparation of a suitable acrylate interpolymer*

To a 500 gallon reactor equipped with an agitator rotating at a speed of 155 r.p.m. is added 195 gallons of water. The temperature is adjusted to 80–88° F. Ten gallons of an aqueous 30% solution of a suspending agent, Alcogum PA-15 (solution of sodium polyacrylate) is added. To the reactor is charged 73 gallons of ethyl acrylate, 4.6 gallons of vinyl-2-chloroethyl ether, and 413 ml. of a solution of 96.7 grams of azobisisobutyronitrile completely dissolved in 1386 ml. of benzene.

Steam may be used to heat the batch to 150° F., over a 30 minute period, and then to 165° to 184° F. over a 60 minute period. The batch is heated carefully until refluxing started at approximately 184° to 186° F. The reactor jacket is drained and the temperature is allowed to rise exothermically to 194° to 198° F.

Three equal portions of 200 ml. of benzene are added every 22 minutes over the next 66 minutes. The batch is heated to reflux temperature in about 81 minutes and held at that temperature for 30 minutes. The unreacted ethyl acrylate is distilled off, and distillation is continued until the distillate contains a maximum of 5 ml. of ethyl acrylate/500 ml. of water. The unreacted ethyl acrylate is allowed to separate from the water; 10 grams of hydroquinoenmethylether per 100 parts of ethyl acrylate layer is added. In a vat, a salt solution is made up consisting of 237 gallons of water and 165 lbs. of sodium chloride. The batch prepared as above, is dropped into the salt solution and agitated at full speed for 30 minutes. The vat is filled with water, and the beads of polymer are allowed to settle for 90 minutes; after this the supernatant is decanted. The washings are repeated by filling the vat with water at 75–85° F., agitating the mixture for 15 minutes, allowing the polymer batch to settle for 60 minutes and then decanting off the water until the water is free of benzene and monomers. The product obtained, a 95/5 by weight ethylacrylate/vinyl-2-chloroethyl ether (EA/VCEE) interpolymer, is a light amber colored solid having a specific gravity at 25°/25° C. of 1.08, and a Mooney Plasticity (ML 1+3), according to ASTM method D1646–61, at 212° F. of 50±5 and at 295° F. of 39. This interpolymer is subsequently used in the following examples.

EXAMPLES 1 TO 9

The curable stock recipe components of Examples 1 to 9 were blended on a rubber mill at ambient temperatures in the quantities as listed in the table below. The curable stocks of this invention thus provided were subjected to a vulcanization temperature of about 320° F. in a rubber press, at 2,000 p.s.i., for 20 minutes, to provide vulcanizates of this invention in the form of testing sheets having elastomeric properties as listed. The sheets were further conditioned or tempered in a forced draft oven at 310° F. for 24 hours to provide the further elastomeric properties as listed.

|  | Example | | | | | | | | |
|---|---|---|---|---|---|---|---|---|---|
|  | 1 | 2 | 3 | 4 | 5 | 6 | 7 | 8 | 9 |
| Recipe Component in p.b.w.: | | | | | | | | | |
| 95/5 EA/VCEE Interpolymer | 100 | 100 | 100 | 100 | 100 | 100 | 100 | 100 | 100 |
| Fast extruding furnace (FEF) carbon black, filler | 40 | 40 | 40 | 40 | 40 | 40 | 40 | 40 | 40 |
| Stearic acid, lubricant | 2 | 2 | 2 | 2 | 2 | 2 | 2 | 2 | 2 |
| Red Lead, curing agent modifier | 5 | 5 | 5 | 5 | 5 | 5 | 5 | 5 | 5 |
| Dimethylthiourea | | 2 | 3 | | | 2 | 2 | 3 | 3 |
| Diethylthiourea | | | | 2 | 3 | 2 | 3 | 2 | 3 |
| Physical Property after Vulcanization at 320° F. for 20 min.: | | | | | | | | | |
| Ultimate tensile strength, in p.s.i | (¹) | 500 | 650 | 1,325 | 1,975 | 1,175 | 1,275 | 1,025 | 950 |
| Ultimate elongation, in percent | (¹) | 1,000 | 650 | 1,000 | 750 | 500 | 450 | 280 | 320 |
| Hardness, in Shore "A" durometer degrees | (¹) | 43 | 38 | 40 | 40 | 35 | 20 | 47 | 38 |
| Elastic modulus, at 300% elongation, in p.s.i | (¹) | 500 | 225 | 200 | 450 | 425 | 700 | | 725 |
| Physical Property after conditioning at 310° F. for 24 hrs: | | | | | | | | | |
| Ultimate tensile strength, in p.s.i | (¹) | 1,275 | 850 | 1,625 | 1,625 | 875 | 875 | 1,175 | 950 |
| Ultimate elongation, in percent | (¹) | 250 | 200 | 720 | 550 | 190 | 140 | 100 | 100 |
| Hardness, in Shore "A" durometer degrees | (¹) | 51 | 49 | 46 | 46 | 52 | 57 | 67 | 64 |
| Elastic modulus, at 300% elongation, in p.s.i | (¹) | | | 675 | 1,025 | | | | |

¹ No vulcanization occurred.

EXAMPLES 10 TO 21

In the following examples, curable rubber stocks of this invention were prepared in a manner similar to that described for Examples 1 to 9. The stocks were subjected to the Mooney Scorch Test, A.S.T.M. method D1646–61, to determine their curability properties, wherein a shearing disc plastometer was used at an elevated curing temperature of about 300° F. The art recognizes that the shorter the time that is required to give 4 point and 10 point readings on the Mooney arbitrary scale, which scale measures increased resistance of the curable stock to a shearing force with increased reading, the faster the stock that is tested cures. It is further recognized in the art that where it takes the stock more than 30 minutes to achieve a 4 point scale reading, substantially little or no cure may be presumed to occur. The curable stocks were vulcanized, as in Examples 1 to 9, in a rubber press at 310° F. for 30 minutes, and subsequently further conditioned or "tempered" for 24 hours at 300° F. in a forced draft oven. The vulcanizates provided after vulcanization, and also after tempering were tested for elastomeric properties, the results of which are listed below. The various thioureas which were used in these examples are as follows:

Prolonged storage of the curable stocks of Examples 2 to 19 may be made at ambient temperatures to provide

| Type (abbreviation) | Thiourea | Structure |
|---|---|---|
| I—(T) | Thiourea | $H_2N-\overset{S}{\underset{\|}{C}}-NH_2$ |
| II—(ESBHT) | Ethylene-sym-bis (cyclohexyl thiourea). | $\left[\text{cyclohexyl}-HN\overset{S}{\underset{\|}{C}}NHCH_2-\right]_2$ |
| II—(HSBCT) | Hexamethylene-sym-bis (cyclohexyl-thiourea). | $\left[\text{cyclohexyl}-HN\overset{S}{\underset{\|}{C}}NH-(CH_2)-\right]_2$ |
| II—(ESBTBT) | Ethylene-sym-bis (tert.-butyl-thiourea). | $\left[(CH_3)_3C-NH\overset{S}{\underset{\|}{C}}-NH-CH_2-\right]_2$ |
| I—(TMT) | Trimethyl thiourea | $CH_3-NH\overset{S}{\underset{\|}{C}}N(CH_3)_2$ |
| I—(TSC) | Thio-semicarbazide | $NH_2\overset{S}{\underset{\|}{C}}NHNH_2$ |
| I—(DCHT) | Dicyclohexyl thiourea | dicyclohexyl-$NH\overset{S}{\underset{\|}{C}}NH$-cyclohexyl |

| | Example | | | | | |
|---|---|---|---|---|---|---|
| | 10 | 11 | 12 | 13 | 14 | 15 |
| Recipe Component, in p.b.w., of Curable Stock: | | | | | | |
| 95/5 EA/VCEE Interpolymer | 100 | 100 | 100 | 100 | 100 | 100 |
| Fast extruding furnace (FEF) carbon black, filler | 40 | 40 | 40 | 40 | 40 | 40 |
| Stearic acid, mill lubricant | 1 | 1 | 1 | 1 | 1 | 1 |
| Type of thiourea curing agent, abbreviation | T | ESBHT | ESBHT | HSBCT | HSBCT | ESBTBT |
| Amount of Thiourea used | 3 | 4 | 4 | 4 | 4 | 4 |
| Red Lead, curing agent modifier | 5 | 5 | 10 | | 5 | |
| Mooney Scorch Viscosity, min./min., to reach 4 pt./10 pt. rise | 5/6 | 3/4 | 3/4 | 17/23 | 5/6 | 19/25 |
| Physical Property after vulcanization at 310° F. for 30 min.: | | | | | | |
| Ultimate tensile strength, in p.s.i | (¹) | 1,180 | 1,040 | (¹) | 1,300 | (¹) |
| Ultimate elongation, in percent | (¹) | 810 | 870 | (¹) | 1,020 | (¹) |
| Hardness, in Shore "A" durometer degrees | (¹) | 43 | 44 | (¹) | 46 | (¹) |
| Elastic modulus, at 300% elongation, in p.s.i | (¹) | 390 | 300 | (¹) | 340 | (¹) |
| Physical Property after conditioning at 300° F. for 24 hrs.: | | | | | | |
| Ultimate tensile strength, in p.s.i | (¹) | 1,580 | 1,470 | (¹) | 1,730 | (¹) |
| Ultimate elongation, in percent | (¹) | 300 | 230 | (¹) | 580 | (¹) |
| Hardness, in Shore "A" durometer degrees | (¹) | 57 | 62 | (¹) | 56 | (¹) |
| Elastic modulus, at 300% elongation, in p.s.i | (¹) | 1,580 | | (¹) | 800 | (¹) |

| | Example | | | | | |
|---|---|---|---|---|---|---|
| | 16 | 17 | 18 | 19 | 20 | 21 |
| Recipe Component, in p.b.w., of Curable Stock: | | | | | | |
| 95/5 EA/VCEE | 100 | 100 | 100 | 100 | 100 | 100 |
| Fast extruding furnace (FEF) carbon black, filler | 40 | 40 | 40 | 40 | 40 | 40 |
| Stearic acid, mill lubricant | 1 | 1 | 1 | 1 | 1 | 1 |
| Type of thiourea curing agent, abbreviation | ESBTBT | TNT | TSC | TSC | DCHT | DCHT |
| Amount of Thiourea used | 4 | 4 | 4 | 4 | 4 | 4 |
| Red Lead, curing agent modifier | 5 | 5 | | 5 | 5 | 5 |
| Mooney Scorch Viscosity, min./min., to reach 4 pt./10 pt. rise | 8/10 | ² 8/9 | ² 8/9 | 8/10 | 16/19 | 24/30+ |
| Physical Property after vulcanization at 310° F. for 30 min.: | | | | | | |
| Ultimate tensile strength, in p.s.i | (¹) | 1,440 | (¹) | 1,440 | (¹) | (¹) |
| Ultimate elongation, in percent | (¹) | 700 | (¹) | 460 | (¹) | (¹) |
| Hardness, in Shore "A" durometer degrees | (¹) | 43 | (¹) | 49 | (¹) | (¹) |
| Elastic modulus, at 300% elongation, in p.s.i | (¹) | 600 | (¹) | 490 | (¹) | (¹) |
| Physical Property after conditioning at 300° F. for 24 hrs.: | | | | | | |
| Ultimate tensile strength, in p.s.i | (¹) | 1,950 | (¹) | 1,330 | (¹) | (¹) |
| Ultimate elongation, in percent | (¹) | 270 | (¹) | 120 | (¹) | (¹) |
| Hardness, in Shore "A" durometer degrees | (¹) | 53 | (¹) | 66 | (¹) | (¹) |
| Elastic modulus, at 300% elongation, in p.s.i | (¹) | 800 | (¹) | | (¹) | (¹) |

¹ Not tested.  ² Test run at 300° F.

excellent bin life, substantially constant physical properties of the stocks during storage, no premature cure of the stocks, and no diminution of curing activity of the stocks during that period. No pitting or corrosion of steel molds or containers results in the formation of these stocks and their vulcanizates or their use.

We claim:
1. A curable acrylate rubber stock comprising in uniform admixture
   (A) an acrylate interpolymer formed from a major portion of a non-chlorine containing monomeric polymerizable acrylate-type material and from a minor portion of at least 1% by weight of said interpolymer of an active chlorine-containing ethylenically unsaturated polymerizable monomeric material; and
   (B) at least one thiourea selected from the group of thioureas consisting of type I thiourea and type II thiourea,
      (i) wherein said type I thiourea is characterized by the structure

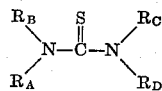

and wherein said $R_A$, $R_B$, $R_C$, and $R_D$ are monovalent radicals selected from the group of monovalent radicals consisting of hydrogen, n-alkyl, iso-alkyl, tert.-butyl, cycloalkyl, cycloalkyl-alkyl, and amino monovalent radicals, and further wherein at least one of said $R_A$, $R_B$, $R_C$, and $R_D$ is hydrogen, and yet further wherein not more than one of said $R_A$, $R_B$, $R_C$, and $R_D$ is a tert.-butyl radical, and yet further wherein not more than one of said $R_A$, $R_B$, $R_C$, and $R_D$ is an amino radical; and
      (ii) wherein said type II thiourea is characterized by the structure

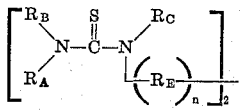

wherein said $R_A$, $R_B$, and $R_C$ are monovalent radicals as defined in (i) above, and wherein said $R_E$ is a divalent n-alkylene radical, and said $n$ is a whole number selected from the numbers 1, 2, and 3.

2. A curable acrylate rubber stock as in claim 1 wherein said nonchlorine containing monomeric polymerizable acrylate-type material is at least one selected from the group of polymerizable acrylate-type monomeric materials consisting of methyl methacrylate, ethyl acrylate, butyl acrylate, methyl acrylate, acrylonitrile, and ethyl hexyl acrylate.

3. A curable acrylate rubber stock as in claim 2 wherein said nonchlorine containing monomeric polymerizable acrylate-type material is ethyl acrylate.

4. A curable acrylate rubber stock as in claim 1 wherein said active-chlorine-containing ethylenically unsaturated polymerizable monomeric material is selected from the group of active-chlorine-containing materials consisting of 2-chloroethylvinyl ether and chloroethyl acrylate.

5. A curable acrylate rubber stock as in claim 4 wherein said active-chlorine-containing monomeric material is 2-chloroethylvinyl ether.

6. A curable acrylate rubber stock as in claim 1 wherein said thiourea is a type I thiourea.

7. A curable acrylate rubber stock as in claim 6 wherein said $R_A$, $R_B$, $R_C$, and $R_D$ are hydrogen.

8. A curable acrylate rubber stock as in claim 6 wherein one of said $R_A$, $R_B$, $R_C$, and $R_D$ is a tert.-butyl radical.

9. A curable acrylate rubber stock as in claim 6 wherein one of said $R_A$, $R_B$, $R_C$, and $R_D$ is an amino radical.

10. A curable acrylate rubber stock as in claim 6 wherein at least one of said $R_A$, $R_B$, $R_C$, and $R_D$ is a cyclohexyl radical.

11. A curable acrylate rubber stock as in claim 6 wherein at least one of said $R_A$, $R_B$, $R_C$, and $R_D$ is an alkyl radical.

12. A curable acrylate rubber stock as in claim 1 wherein said thiourea is a type II thiourea.

13. A curable acrylate rubber stock as in claim 12 wherein $n$ is 1.

14. A curable acrylate rubber stock as in claim 12 wherein $n$ is 3.

15. A curable acrylate rubber stock as in claim 12 wherein $R_E$ is a methylene radical.

16. A curable acrylate rubber stock as in claim 12 wherein $R_E$ is a propylene radical.

17. A curable acrylate rubber stock as in claim 12 wherein one of said $R_A$, $R_B$, and $R_C$ is a cycloalkyl radical.

18. A curable acrylate rubber stock as in claim 12 wherein one of said $R_A$, $R_B$, and $R_C$ is a tert.-butyl radical.

19. A curable acrylate rubber stock as in claim 1 wherein said thiourea is present in from 1 to 6 parts by weight per 100 parts by weight of said acrylate interpolymer.

20. A curable acrylate rubber stock as in claim 1 wherein said active-chlorine-containing ethylenically unsaturated polymerizable monomeric material forms about 5% by weight of said acrylate interpolymer.

21. A curable acrylate rubber stock as in claim 1 further comprising a curing agent modifier.

22. A curable acrylate rubber stock as in claim 21 wherein said curing agent modifier is red lead.

23. A curable acrylate rubber stock as in claim 21 wherein said curing agent modifier is present in from 2 to 10 parts by weight per 100 parts by weight of said acrylate interpolymer present.

24. A non-corrosive process for providing vulcanizates of acrylate interpolymers comprising the steps of
   (A) Admixing to a uniform consistency
      (a) an acrylate interpolymer formed
         (i) from a major portion of a non-chlorine containing monomeric polymerizable acrylate-type material selected from the group of acrylate-type materials consisting of methyl methacrylate, ethyl acrylate, butyl acrylate, methyl acrylate, acrylonitrile, and ethyl hexyl acrylate, and
         (ii) from a minor portion of at least 1% by weight of an active-chlorine-containing ethylenically unsaturated polymerizable monomeric material; and
      (b) at least one thiourea present in from 1 to 6 parts by weight per 100 parts by weight of said interpolymers and selected from the group of thioureas consisting of type I thiourea and type II thiourea,
         (i) wherein said type I thiourea is characterized by the structure

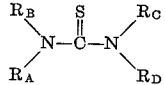

and wherein said $R_A$, $R_B$, $R_C$, and $R_D$ are monovalent radicals selected from the group of monovalent radicals consisting of hydrogen, n-alkyl, isoalkyl, tert.-butyl, cycloalkyl, cycloalkyl alkyl, and amino monovalent radicals, and wherein at least one of said $R_A$, $R_B$, $R_C$, and $R_D$ is hydrogen, and further wherein not more than one of said $R_A$, $R_B$, $R_C$, and $R_D$ is a tert.-butyl radical, and yet further wherein not more than one of said $R_A$, $R_B$, $R_C$, and $R_D$ is an amino radical; and (ii) wherein said type II thiourea is characterized by the structure

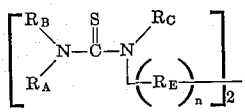

wherein said $R_A$, $R_B$, and $R_C$ are monovalent radicals as defined in step A(b)(i) above, $R_E$ is a divalent alkylene radical, and $n$ is a whole number selected from the numbers 1, 2 and 3;

(B) Heating the admixture prepared in step A to an effective curing temperature within the range of about 250° F. to about 450° F. to provide an elastomeric vulcanizate.

25. A process as in claim 24 wherein said thiourea is a type I thiourea.

26. A process as in claim 24 wherein said thiourea is a type II thiourea.

27. A process as in claim 24 wherein said active-chlorine-containing ethylenically unsaturated polymerizable monomeric material is selected from the group of active-chlorine-containing materials consisting of 2-chloroethylvinyl ether and chloroethyl acrylate.

28. A process as in claim 25 wherein said type I thiourea is thiourea.

29. A process as in claim 25 wherein said type I thiourea is dimethyl thiourea.

30. A process as in claim 25 wherein said type I thiourea is diethyl thiourea.

31. A process as in claim 24 wherein said thiourea is a mixture of more than one of said thioureas.

32. A process as in claim 31 wherein said mixture is a mixture of dimethyl and diethyl thioureas.

33. A process as in claim 25 wherein said type I thiourea is tert.-butyl thiourea.

34. A process as in claim 25 wherein said type I thiourea is trimethyl thiourea.

35. A process as in claim 25 wherein said type I thiourea is thiosemicarbazide.

36. A process as in claim 26 wherein said type II thiourea is n-hexamethylene sym-bis(cyclohexyl thiourea).

37. A process as in claim 26 wherein said type II thiourea is ethylene-sym-bis(cyclohexyl thiourea).

38. A process as in claim 26 wherein said type II thiourea is ethylene-sym-bis(tert.-butyl thiourea).

References Cited

UNITED STATES PATENTS

| | | | |
|---|---|---|---|
| 2,600,414 | 7/1952 | Mast et al. | 260—79.5 |
| 2,804,447 | 8/1957 | Naylor | 260—79.5 |

FOREIGN PATENTS 734,390  6/1953  Great Britain.

JOSEPH L. SCHOFER, *Primary Examiner.*

D. K. DENENBERG, *Assistant Examiner.*

CERTIFICATE OF CORRECTION

Patent No. 3,338,876　　　　　　　　　　　　　　August 29, 1967

Gaylord A. Kanavel et al.

It is hereby certified that error appears in the above numbered patent requiring correction and that the said Letters Patent should read as corrected below.

Column 2, line 22, for "mathacrylate" read -- methacrylate --; column 6, line 1, for "quinoenmethylether" read -- quinonemethyl ether --; columns 7 and 8, first table, the structure for "II-(HSBCT)" should appear as shown below instead of as in the patent:

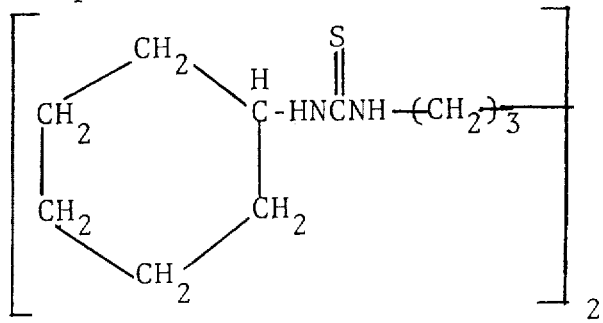

same columns 7 and 8, last table, "Example 17", line 3, for "TNT" read -- TMT --; same table "Example 21" line 6, strike out "5"; column 10, line 67, for "hydrogen-" read -- hydrogen, --.

Signed and sealed this 18th day of March 1969.

(SEAL)
Attest:

EDWARD M. FLETCHER, JR.　　　　　　　　　　EDWARD J. BRENNER
Attesting Officer　　　　　　　　　　　　　Commissioner of Patents